(12) United States Patent
Minkin (10) Patent No.: US 9,463,930 B2
(45) Date of Patent: Oct. 11, 2016

(54) TUBULAR CONVEYOR BELT OR POCKET CONVEYOR BELT HAVING A CHEVRON PROFILE ARRANGEMENT ON THE CARRYING SIDE THEREOF

(71) Applicant: ContiTech Transportbandsysteme GmbH, Hannover (DE)

(72) Inventor: Andrey Minkin, Goettingen (DE)

(73) Assignee: ConiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 14/935,206

(22) Filed: Nov. 6, 2015

(65) Prior Publication Data

US 2016/0060040 A1 Mar. 3, 2016

Related U.S. Application Data

(63) Continuation of application No. PCT/EP2014/054296, filed on Mar. 6, 2014.

(30) Foreign Application Priority Data

May 6, 2013 (DE) .......................... 10 2013 104 595
Jun. 21, 2013 (DE) .......................... 10 2013 106 479

(51) Int. Cl.
*B65G 17/04* (2006.01)
*B65G 15/42* (2006.01)
(Continued)

(52) U.S. Cl.
CPC ............... *B65G 15/42* (2013.01); *B65G 15/08* (2013.01); *B65G 15/40* (2013.01)

(58) Field of Classification Search
CPC ....... B65G 15/08; B65G 15/40; B65G 15/42

USPC ............... 198/715, 716, 808, 819, 820, 821, 198/690.2, 699, 699.1

See application file for complete search history.

(56) References Cited

U.S. PATENT DOCUMENTS 810,510 A 1/1906 Robins, Jr.
874,982 A * 12/1907 Norton .................. B65G 15/42
198/690.2

(Continued)

FOREIGN PATENT DOCUMENTS

DE 920 477 C 11/1954
DE 1 182 593 B 11/1964

(Continued)

OTHER PUBLICATIONS

International Search Report dated May 23, 2014 of international application PCT/EP2014/054296 on which this application is based.

*Primary Examiner* — William R Harp
(74) *Attorney, Agent, or Firm* — Walter Olttesen, P.A.

(57) ABSTRACT

A conveyor belt includes a carrying-side cover plate and a running-side cover plate. The cover plates conjointly define a belt body having a plurality of reinforcement elements embedded therein. The belt body has edge zones and is closable so as to cause the edge zones to overlap and be in mutual contact engagement to form a tube conveyor belt or a pocket conveyor belt. The carrying-side cover plate has a chevron profile arrangement which includes a plurality of diagonal elements extending in both a longitudinal direction and a transverse direction of the conveyor belt. Each two of the diagonal elements conjointly defines a pair with multiple pairs defining a V-formation having a tip aligned in a direction opposite to the direction of movement of the belt.

19 Claims, 10 Drawing Sheets

(51) Int. Cl.
   *B65G 15/40*   (2006.01)
   *B65G 15/08*   (2006.01)

(56) References Cited

U.S. PATENT DOCUMENTS

| | | | |
|---|---|---|---|
| 3,392,817 A | 7/1968 | Grimm | |
| 3,756,382 A * | 9/1973 | Adey, Jr. | B65G 15/42 198/690.2 |
| 5,351,810 A | 10/1994 | Tingskog | |
| 5,511,652 A * | 4/1996 | McGinnis | B65G 15/08 198/690.2 |
| 6,029,801 A * | 2/2000 | Odin | B65G 15/36 198/819 |
| 6,170,646 B1 | 1/2001 | Kaeb et al. | |
| 6,371,280 B1 * | 4/2002 | Lindner | A01F 15/18 198/690.2 |
| 2001/0045344 A1 | 11/2001 | Tschantz | |
| 2012/0000751 A1 | 1/2012 | Boursier | |
| 2016/0031650 A1 * | 2/2016 | Petersen | B65G 15/42 198/699.1 |
| 2016/0039609 A1 * | 2/2016 | Lurie | B65G 23/14 198/819 |

FOREIGN PATENT DOCUMENTS

| | | |
|---|---|---|
| DE | 297 20 710 U1 | 3/1998 |
| FR | 1496897 A | 10/1967 |
| GB | 887698 A | 1/1962 |
| GB | 1197700 A | 7/1970 |
| JP | S4848385 U | 6/1973 |
| JP | 58-83314 U | 6/1983 |
| JP | 58-216803 A | 12/1983 |
| JP | 2002-370812 A | 12/2002 |
| WO | 2004/037689 A1 | 5/2004 |
| WO | 2005/085101 A1 | 9/2005 |

* cited by examiner

TUBULAR CONVEYOR BELT OR POCKET CONVEYOR BELT HAVING A CHEVRON PROFILE ARRANGEMENT ON THE CARRYING SIDE THEREOF

CROSS REFERENCE TO RELATED APPLICATIONS

This application is a continuation application of international patent application PCT/EP2014/054296, filed Mar. 6, 2014, designating the United States and claiming priority from German application nos. 10 2013 104 595.2, filed May 6, 2013, and 10 2013 106 479.5, filed Jun. 21, 2013, and the entire content of each of the above applications is incorporated herein by reference.

BACKGROUND OF THE INVENTION

For the purpose of conveying loose materials such as bulk materials, that is, rock/stones, mineral resources, excavation material, agricultural products, et cetera, use has long been made of troughed conveyor belts, which receive the conveyable material at a receiving location on their carrying side and discharge the same at a discharge location. Since the conveyable material is open to the environment as it is being transported, contaminants and environmental weathering influences can act on the conveyable material, and the latter can pollute the environment and also pose a risk to the environment. It is also the case, on account of their configuration, that troughed conveyor belts can be used to realize curves and gradients only to a limited extent. It is thus not usually possible, in conventional belt systems, to exceed an angle of inclination of 20° in gradient. If this is the limit of feasibility, it is necessary to connect a plurality of inter alia specific conveying belts with transfer locations. This increases the complexity for, and therefore the costs of, the conveyor system to a considerable extent.

In order to eliminate these disadvantages, conveyor belts which are closed during operation and are referred to as tube belts, tubular conveyor belts, pipe belts or mega pipes, were developed in the 1980s. The tube belts are rolled together between the receiving location and discharge location to give a closed tube, by virtue of the outer belt flanks overlapping and thus fully enclosing the conveyable material. This means that the conveyable material in the tube belt and the environment are completely separated from one another, since the tube belt remains closed over the conveying route. It is only for the purposes of receiving and discharging the transportable material that a tube belt widens and assumes the form of a conventional troughed conveyor belt. This rules out contamination of the bulk material along the conveying route and the associated environmental pollution. It is also the case that the conveyable material cannot be influenced by the environment during transportation. Further essential advantages of the tube belts in relation to the conventional troughed conveyor belts reside in the possibility of realizing very narrow three-dimensional curves and in the relatively high angles of inclination of up to 35° in gradient, which means that complicated three-dimensional curved routes can be realized by a single system. Since tube belts usually have a smooth surface on their carrying side, the angles of inclination are nevertheless limited to a gradient of up to 35°, depending on the bulk material properties.

In order to eliminate these disadvantages, conveyor belts which are closed during operation and are known as SICON®conveyor belts or pocket (conveyor) belts have also been developed. A pocket conveyor belt comprises two textile-reinforced profiles each with a steel cable vulcanized therein as a tension member. The profiles run over the sets of rollers and carry the pocket which accommodates the conveyable material. This droplet-shaped pocket consists of highly flexible rubber and is connected to the profiles by means of hot vulcanization. The profiles are arranged one above the other during transportation, and the belt is therefore closed off in a dust-tight manner. The belt is carried, and guided, by specific sets of rollers which, for the closed state of the belt, comprise a carrying roller and a guide roller. Further sets of rollers, each comprising a carrying roller and one to three guide rollers, are available for loading and unloading the belt and for curves and gradients.

In a manner similar to tube belts, the essential advantages of the pocket conveyor belt in relation to the conventional troughed conveyor belts reside in the possibilities of realizing very narrow three-dimensional curves and in the relatively high angles of inclination of up to 35°; in the case of conventional belt systems, the angle of inclination cannot usually exceed 20°. This makes it possible to realize complicated three-dimensional curved routes by a single system, without any transfer locations on the conveying route. In addition, the material in the pocket conveyor belt and the environment are completely separated from one another, since the pocket conveyor belt remains closed over the conveying route. For loading purposes, the pocket conveyor belt is opened with the aid of a specific set of rollers for opening and closing the belt. The belt can be unloaded at an overhead discharge point or an S-shaped discharge station. At the S-shaped discharge station, it is possible optionally for the belt to be emptied or for the conveyable material to be poured into the belt again.

A pocket conveyor belt differs from the conventional tube belt not just in construction, but also in functioning and areas of application. It is thus possible for a pocket conveyor belt, depending on the profile size, to negotiate radii of 0.6 m or 1.0 m, which cannot be realized by a conventional tube belt. The minimum curve radius which can be realized by a tube belt is approximately 30 m. In contrast to the tube belt, the conveyor length, the conveyor cross section and the associated conveyor capacity and maximum possible material particle size of a pocket conveyor belt are very limited. All of this predestines a pocket conveyor belt for an "in-plant closed" transport of industrial bulk materials, while a tube belt is considered in practice to be more akin to an "out-plant closed" conveying principle for the entire range of particle sizes.

For a number of application cases, the advantages of the tube belts or the pocket conveyor belts and the steep conveyor belts are required at the same time, that is, a tube belt or pocket conveyor belt which can be used even at angles of inclination above 35°.

U.S. Pat. No. 6,170,646, GB 1197700, U.S. Pat. No. 5,351,810, JP 480 48 385 U, JP 580 83 314 U, United States patent application publication 2012/0000751 A1, FR 14 968 97 A, GB 88 76 98 A, JP 582 16 803 A, U.S. Pat. No. 3,392,817 A and WO2005/085101 A1 disclose a number of technical solutions in this respect for increasing the angle of inclination of tube belts and pocket belts by differently shaped profiles having been applied to the carrying-side cover panel of a tube belt or pocket belt. The core idea of these approaches has been in each case, for elastic rubber or plastic-material strips connected to the conveyor belt to be fitted transversely to the longitudinal direction of the conveyor belt and to be offset at certain intervals from one another in the longitudinal direction. It is possible here for the transverse strips to span both the entire belt width and just part of the belt width. It can be established from these documents that the transverse strips may be configured both in a continuous state, in the form of ribs or wave-like strips, and in a divided state, for example, at right angles, in sawtooth form or in trapezoidal form. The divided transverse strips here are configured such that, when the tube belt or pocket belt is deformed in tube or pocket form, the flanks of the strip butt more or less against one another or overlap and thus form partition walls spaced apart in the longitudinal direction. Depending on the height, that is, radial formation, of the transverse strips, the conveyable material is retained in a force-fitting and form-fitting manner during transportation, and it is therefore possible to prevent the conveyable material from sliding back in the conveyor belt and thus to realize relatively large gradients. In the case of the transverse strips being virtually closed, it is even possible to realize vertical conveying directions, wherein purely form-fitting force transmission takes place.

It is a disadvantage of the above-described tube belts or pocket belts that they involve very high outlay, and are therefore expensive to produce. It is thus necessary for the transverse strips, on account of their size, in particular their radial extent, to be produced in the form of separate elements and to be applied subsequently to the conveyor belt for example by means of adhesive bonding, that is, by cold vulcanization. This requires the further operating steps of the transverse strips being separately produced and subsequently installed on the conveyor belt. Single-piece production of conveyor belts with transverse strips, that is, simultaneously with the vulcanization of the conveyor belt, is ruled out in production terms on account of the size of the transverse strips. It may also be necessary for the transverse strips to be installed on the conveyor belt for the first time at the site of use of the conveyor belt, so that there is no increase in the volume of the conveyor belt for transportation purposes. Furthermore, the adhesive-bonding locations constitute a weak point which, over time, will fail sooner than other constituent parts of the conveyor belt.

It is also disadvantageous that, if the known tube belts or pocket belts are suitable for relatively large angles of inclination, that is, above 35° in gradient, the conveyable material is retained in a form-fitting manner by the transverse strips and the latter are subjected to corresponding loading. This requires a corresponding stable and radial formation of the transverse strips with higher material and production costs than in the case of flatter profilings, although the latter do not allow such gradients. It is also the case that the higher transverse strips increase the transportation costs of the conveyor belts, because the latter cannot be wound as tightly for transportation purposes, that is, less belt length per rolled together belt drum can be transported in one journey. At the same time, this means that the pieces of belt which can be transported per drum in one journey are shorter, and there is therefore an increase in the outlay for installing the endlessly closed conveyor belts in the conveyor-belt system. As is also the case with conventional tube belts, the pocket conveyor belts have a smooth surface, as a result of which it is possible to realize the angles of inclination of up to 35°, depending on the bulk-material properties.

SUMMARY OF THE INVENTION

It is an object of the present invention to provide a conveyor belt of the type described above which can be produced easily and cost-effectively and transported and can be used at the same time as a roller conveyor belt or pocket conveyor belt and allows higher gradients than those which have been known hitherto, that is, angles of inclination above 35° in gradient.

The conveyor belt of the invention is movable in a conveying direction (Q) and defines a longitudinal direction (X) and a transverse direction (Y). The conveyor belt includes: a carrying-side cover plate of elastomer material and a running-side cover plate of elastomer material; the cover plates conjointly defining a belt body having a plurality of reinforcement elements embedded therein; the belt body having respective edge zones and being closable so as to cause the edge zones to overlap and be in mutual contact engagement to form one of a tube conveyor belt and a pocket conveyor belt; the carrying-side cover plate having a profile arrangement formed thereon essentially perpendicular thereto; the profile arrangement being a chevron profile arrangement including a plurality of diagonal elements which extend in both the longitudinal direction (X) and the transverse direction (Y) of the conveyor belt; and, each two of the diagonal elements conjointly defining a pair with multiple pairs defining a V-formation having a tip aligned in a direction opposite to the conveying direction (Q).

Accordingly, the present invention relates to a conveyor belt, which is characterized in that the profiling is a chevron profiling, which has diagonal elements which extend, at least in part, both in the longitudinal direction and in the transverse direction of the conveyor belt and, together in pairs, give a V-shape, of which the point is oriented in the longitudinal direction counter to the conveying direction. The profiling is provided preferably over the entire longitudinal direction of the conveyor belt.

The present invention is based on the finding that the angle of inclination of a tubular conveyor belt or a pocket conveyor belt can be increased to above 35° in gradient by the features of the oblique protuberance belts, in which a profiling running obliquely in relation to the conveying direction on the upper side of the carrying-side cover panel counteracts sliding of the conveyable material in the case of inclination, being transferred, and applied, to the tubular conveyor belts or pocket conveyor belts. Such profilings for oblique-protuberance belts are known to a person skilled in this art as chevron profiling. The tubular conveyor belt or pocket conveyor belt can then take on inclinations up to an angle of repose of the conveyable material or above. When a tube belt with the bulk material is rolled together, or a pocket conveyor belt with the bulk material is closed together, by the belt in its troughed or spread-out or flat form being made into a rolled-together tube form or closed droplet form, an active Rankine state of the material (bulk material is loosened) changes into the passive state (bulk material is compact), as a result of which it is possible to expect inclinations for a tubular conveyor belt or pocket conveyor belt which are higher than an angle of repose of the conveyable material. The angle of repose or the effective internal friction angle of a bulk material is usually considerably higher than a wall friction angle. For most bulk materials, it is between 22° and 52°, but may also be greater.

The oblique-protuberance belts are also known as chevron belts, steep conveyor belts or cleated belts. They constitute troughed conveyor belts with a profiled carrying-side cover panel. This profiling, which can counteract sliding of the conveyor belt at angles of inclination up to 45°, means that the oblique-protuberance belts belong to the family of steep conveyor belts. As troughed conveyor belts, however, they have the disadvantages which are avoided, in the case of tubular conveyor belts, by being closed. Therefore, a combination of these conveyor-belt features results in a tubular conveyor belt or a pocket conveyor belt which can be used in the form of the steep conveyor belt, that is, at angles of inclination of above 35° in gradient, without the essential advantages of the tubular conveyor belt or pocket conveyor belt being lost.

The profiling of the oblique-protuberance belts here differs from the transverse strips which are known in the case of tubular conveyor belts or pocket conveyor belts for the purpose of increasing the angle of inclination. This is because these transverse strips are dimensioned, in particular in the radial direction of the closed conveyor belt or perpendicularly to the surface of the carrying-side cover panel, such that the conveyable material which is to be retained is retained by them in a partially to fully form-fitting manner. For this purpose, the transverse strips project, in part, in the direction of the center axis of the closed conveyor belt to the extent where the transverse strips form individual longitudinally virtually fully closed chambers in the interior of the conveyor belt. Such transverse strips, however, require separate production and installation.

In contrast, the profilings of the oblique-protuberance belts are distinguished in that they are of such flat configuration in the radial direction of the closed tubular conveyor belt or pocket conveyor belt, or perpendicularly to the surface of the carrying side cover plate, that they can also be formed preferably during production of the conveyor belt, that is, during vulcanization. This means that they are formed in one piece with the carrying-side cover panel. This method of production, however, limits the height of the profiling.

However, the profilings of the oblique protuberance belts make up for this disadvantage, as the name of this type of conveyor belt expresses, by their arrangement or configuration. Therefore, in contrast to the transverse strips running in the circumferential direction of the prior art tubular conveyor belts, the profilings are arranged obliquely in relation to the conveying direction, that is, in relation to the longitudinal direction of the conveyor belt. Obliquely here means that the profilings extend in the form of diagonal elements, at least in part, both in the longitudinal direction and in the transverse direction of the conveyor belt. At the same time, the oblique elements of the profiling, which may also be referred to as oblique protuberances, are arranged such that, together, they form V-shaped points, in which the conveyable material can be supported and, by virtue of the internal friction within the conveyable material, the conveyable material can be retained even in the case of relatively high gradients. In this way, the force is transmitted between the carrying-side cover panel and the conveyable material via the oblique profilings predominantly in a force fitting manner, as follows.

In that region of the belt width in which the profiling is applied, that is, in the central region as seen in the transverse direction of the conveyor belt, the oblique protuberances cover the entire length, as seen in the longitudinal direction, of the conveyor belt continuously. The exceptions are at least the belt flanks, which form the overlapping region of the tubular conveyor belt, and possibly the regions adjacent to the overlapping region and/or the width of the oblique protuberance profiling corresponding essentially to the belt width up to the horizontal of the closed pocket conveyor belt, that is, the width of that region of the droplet shape of the pocket conveyor belt which accommodates the conveyable material. This means that, even in those regions of the surface of the carrying side cover panel where, in the interspace between the offset profilings, there is no force transmission taking place, or conveyable material being carried along, by the oblique protuberances themselves, the forces are transmitted from the conveyable material to the conveyor belt as a result of the internal frictional forces of the conveyable material. The continuous arrangement of the oblique protuberances in the longitudinal direction ensures a better grip between the conveyor belt and the conveyable material. Since the oblique protuberances have relatively low heights, that is, usually between 10 mm and 50 mm, and result, in particular, in an increase in the wall friction between the conveyable material and the conveyor belt, they provide for force-fitting material transportation on account of the very high wall friction coefficient over the entire cover-panel surface onto which the oblique protuberances are applied, in conjunction with the internal friction coefficient of the conveyable material. In contrast to this, the known tubular conveyor belts or pocket conveyor belts with transverse strips provide for combined, that is, form-fitting and force-fitting, or even just form-fitting, transportation of the conveyable material when the transverse strips are of such high dimensions in the radial direction that they cover virtually the entire cross section of the tubular conveyor belt or pocket conveyor belt.

A further advantage of the oblique-protuberance profiling for tubular conveyor belts or pocket conveyor belts resides in their particular obliquely running arrangement and in the relatively low height of the oblique protuberances. During deformation to form the tube or droplet shape, the small oblique protuberances, in any cross section of the tubular conveyor belt or pocket conveyor belt, are subjected only to relatively low bending stress at certain points. In contrast, a high transverse-strip profiling in the closed tubular conveyor belt or pocket conveyor belt is subjected to relatively high linear bending stress.

The tension members, or else strength members, used for the conveyor belt may be steel cables, in the case of steel-cable conveyor belts, textiles, in the case of textile conveyor belts, or also aramid, in the case of aramid conveyor belts. The textiles may consist of polyester, polyamide, cotton or combinations thereof. For example, in the case of textile conveyor belts, it is possible to have textile carcasses which have polyester threads in a warp direction (longitudinal direction) and polyamide threads in the weft direction (transverse direction) (EP textiles). It is also possible to use polyester threads in both directions (EE textiles) or polyamide threads in both directions (PP textiles). Use can further be made of polyester, polyamide and cotton threads in the warp direction and polyamide and cotton threads in the weft direction (EP-B-PB textiles). Since PP textile expands to a comparatively pronounced extent in the longitudinal direction and EE textile is comparatively expensive, the EP textile constitutes a compromise solution and is the one used most often for textile belts.

According to one aspect of the present invention, the width of the profiling corresponds essentially to the belt width between the peripheral zones. This means that the profiling takes up, as far as possible, the entire width between the overlapping peripheral zones in order, on the one hand, to leave the zones free and not to impair the overlapping or closing action of the tubular conveyor belt and, on the other hand, to retain as much conveyable material as possible via the profiling.

According to one aspect of the present invention, the width of the chevron profiling corresponds essentially to the belt width up to the horizontal of the closed pocket conveyor belt. This means that the profiling is formed over the width of the conveyor belt such that, in the case of the droplet-form pocket conveyor belt being closed, the profiling can retain conveyable material in the regions in which the conveyable material butts, as a result of gravitational force, against the carrying-side surface of the pocket conveyor belt. Above the horizontal, it is possible to dispense with the profiling because, here, the conveyable material butts rather against the conveyable material retained vertically beneath and less against the carrying-side surface of the pocket conveyor belt.

According to a further aspect of the present invention, the profiling is repeated a number of times, preferably not more than three times, particularly preferably twice, in the transverse direction. For this purpose, either identical or different profilings are arranged one beside the other in the transverse direction so that, even in the case of relatively wide conveyor belts, the profilings can retain the conveyable material according to the invention. This is because if, in the case of relatively wide belts, the V-shape of the diagonal elements is formed once over the entire width of the conveyor belt, then there is merely one effective point in which the conveyable material can be supported. This may be sufficient for relatively narrow belt widths, even at angles of inclination above 35° in gradient, but, in the case of relatively wide belt widths, a plurality of V-shaped arrangements of the diagonal elements are advantageous in order to optimize the retaining action of the profiling.

According to a further aspect of the present invention, the profiling has a height, as seen in the direction perpendicular to the carrying-side cover panel, which corresponds to a maximum of twice the belt thickness, preferably to a maximum of one and a half times the belt thickness, particularly preferably to a maximum of a single belt thickness. This size ratio ensures that the profiling can be formed in one piece, that is, can be vulcanized together, with the belt body or with the carrying-side cover panel. In specific terms, it is customary to have belt thicknesses up to 50 mm, which may be provided, by customary production methods, with profilings between 10 mm and 50 mm.

According to a further aspect of the present invention, the profiling has a height, as seen in the direction perpendicular to the carrying-side cover panel, which corresponds to a maximum of a tenth, preferably to a maximum of a fiftieth, particularly preferably to a maximum of a hundredth, of the belt width. This size ratio ensures that the profiling can be formed in one piece, that is, vulcanized together, with the belt body or with the carrying-side cover panel. In specific terms, it is customary to have belt widths for tube belts up to 3,200 mm in the unrolled state and possible, with increased outlay, to achieve 6,400 mm, which may be provided, by conventional production methods, with profilings between 10 mm and 50 mm. For SICON® pocket conveyor belts, it is customary to have belt widths up to 1,400 mm in the unfolded state.

According to a further aspect of the present invention, the profiling has a plurality of individual diagonal elements, which are spaced apart from one another by an interruption and together extend both in the longitudinal direction and in the transverse direction of the conveyor belt to give, jointly, a V-shape, wherein the individual diagonal elements have a different orientation, preferably an orientation extending more in the longitudinal direction, to that of all of the adjacent diagonal elements taken as a whole. In this way, the closed V-shape is interrupted to give individual elements, and therefore the internal frictional forces of the conveyable material act at the interruptions and can thus retain the conveyable material on the conveyor belt. In other words, the contact surfaces with force-fitting action will increase as a result of the interspaces between the individual diagonal elements. If the individual diagonal elements are arranged at a steeper angle on the carrying side cover panel than all of the diagonal elements forming the V-shape, then it is also the case that those ends of the individual diagonal elements which are oriented in a conveying direction subject the conveyable material to a retaining action.

According to a further aspect of the present invention, the point of the V-shape has a longitudinal extension in the longitudinal direction counter to the conveying direction. The longitudinal extension can support the point counter to the load of the retained conveyable material resting thereon.

According to a further aspect of the present invention, at least one of the diagonal elements, at its ends directed away from the point, has a longitudinal extension in the longitudinal direction. The longitudinal extension extends in the longitudinal direction in relation to the peripheral zones and/or adjacent profilings such that the longitudinal extension of the diagonal elements can act as a lateral retaining element for the conveyable material.

According to a further aspect of the present invention, the point is configured in the form of an element which runs in the transverse direction and is spaced apart from the diagonal elements preferably by clearances. In this way, the point constitutes a transversely running edge which may be connected to the diagonal elements or, preferably, may be spaced apart from the same. In the latter case, the internal frictional force of the conveyable material can act in the interruptions. In both cases, the conveyable material can be retained on this edge in a different form-fitting and force-fitting manner than is the case for a pointed configuration of the point of contact between the diagonal elements.

According to a further aspect of the present invention, the conveyor belt has at least one transverse reinforcement. This provides stability to the round shape of the rolled-together tubular conveyor belt, even in the case of the latter being used continually over a relatively long period of time. For this purpose, it is possible, for steel-cable conveyor belts and textile conveyor belts, to use both steel-cable transverse reinforcements and textile transverse reinforcements, both jointly and as alternatives.

According to a further aspect of the present invention, the chevron profiling is configured in the form of a constituent part of the carrying-side cover panel. This reduces the production costs and simplifies transportation of the conveyor belt.

BRIEF DESCRIPTION OF THE DRAWINGS

The invention will now be described with reference to the drawings wherein:

FIGS. 6A to 7F show schematic plan views of various embodiments of a single-formation profiling of a conveyor belt according to the invention;

DESCRIPTION OF THE PREFERRED EMBODIMENTS OF THE INVENTION

Figure 1:
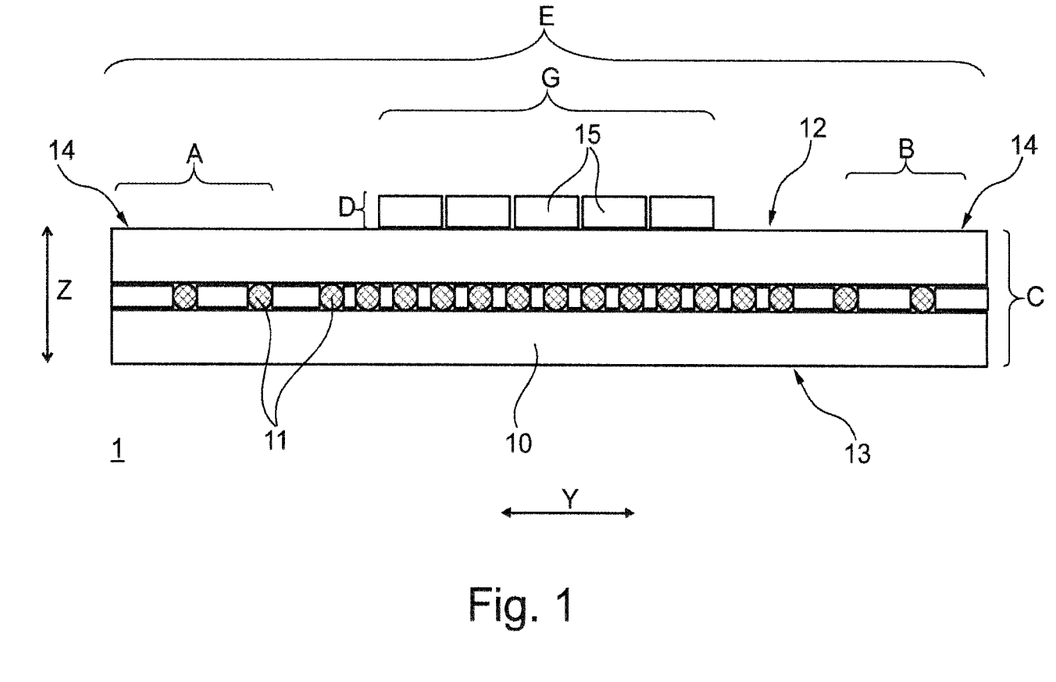
FIG. 1 shows a schematic illustration of a section through a conveyor belt according to the invention.
Figure 3A:
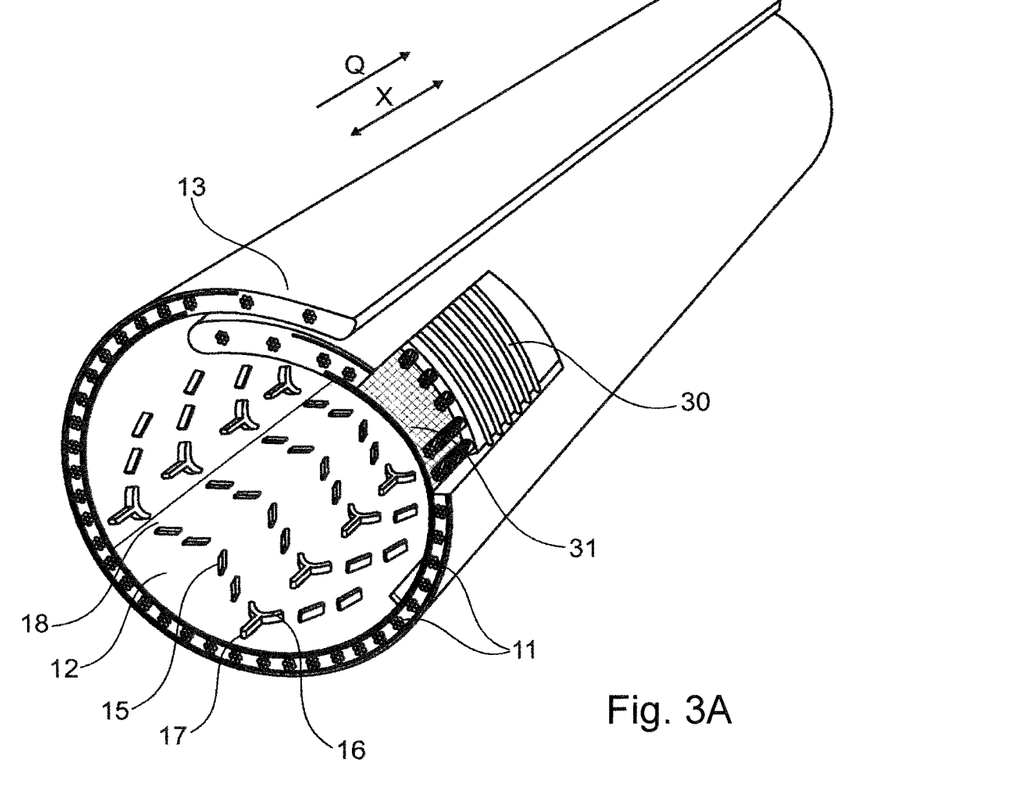
FIG. 3A shows a schematic perspective illustration of a steel-cable conveyor belt according to the invention.
Figure 3B:
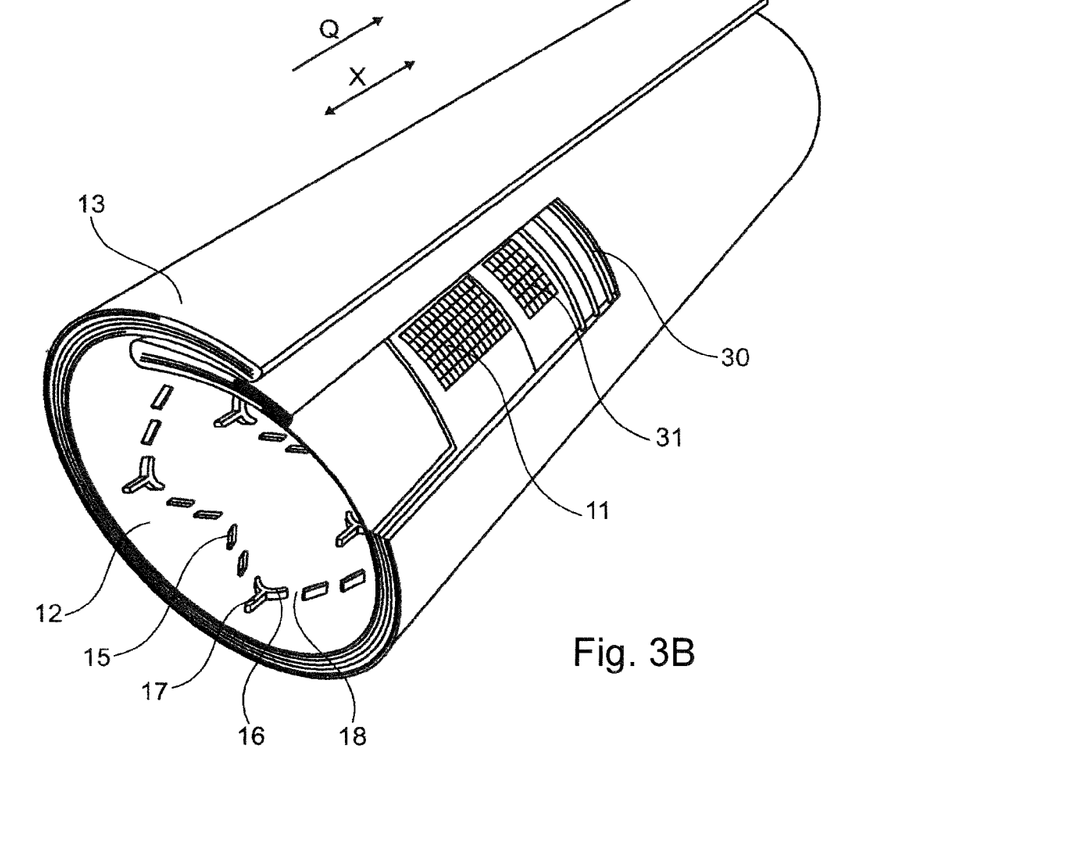
FIG. 3B shows a schematic perspective illustration of a textile conveyor belt according to the invention.

FIG. 1 shows a schematic illustration of a section through a conveyor belt 1 according to the invention. The conveyor belt 1 has a belt body 10, of width E in transverse direction Y, having a carrying-side cover panel 12 and a running-side cover panel 13. Reinforcement members 11 are embedded in the belt body 10, between the two cover panels (12, 13), the reinforcement members running in the longitudinal direction X (cf. FIGS. 3A and 3B) and absorbing the tensile forces of the conveyor belt 1. The reinforcement members 11, or also tension members 11, may be, for example, steel cables 11, in the case of steel-cable conveyor belts 1 (cf. FIG. 3A), or textiles 11 (cf. FIG. 3B) made of, for example, polyester, polyamide, cotton, et cetera, in the case of textile conveyor belts 1, or aramid 11 (not illustrated), in the case of aramid conveyor belts 1. The height C of the conveyor belt 1 extends in the direction Z, that is, perpendicularly to the transverse direction Y and longitudinal direction X.

Figure 2:
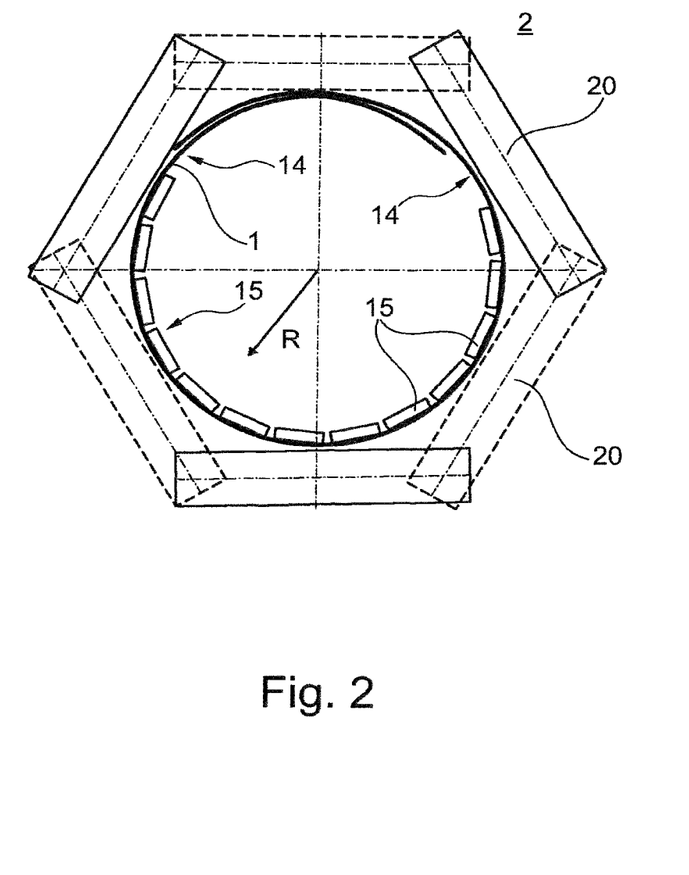
FIG. 2 shows a schematic illustration of a section through a carrying-roller station of a tubular conveyor belt.

In the transverse direction Y, that is, in the direction perpendicular to the conveying direction X, the carrying-side cover panel 12 has overlapping regions 14, on respective outer peripheries (A, B). The overlapping regions may also be referred to as a belt flanks 14 or longitudinal periphery 14. These regions 14 provide for mutual overlapping, in order to close the conveyor belt 1 to provide a tubular conveyor belt 1 (tube belt 1). A corresponding closed illustration of the conveyor belt 1 between the carrying rollers 20 of a carrying-roller station 2 is shown in FIG. 2. In this illustration, the direction Z of the conveyor belt 1 in the spread-out state (cf. FIG. 1) corresponds to the radial direction R of the conveyor belt 1 in the rolled-together state. In order to give the tubular conveyor belt 1 in the rolled-together state a stable, round form, even over a relatively long period of use, that is, in order to avoid "collapse", transverse reinforcements (30, 31) may be provided, in addition, in or between the cover panels (12, 13). The transverse reinforcements may be textile reinforcements 31 or steel-cable transverse reinforcements 30, that is, thin steel cables situated closely together.

The carrying-side cover panel 12 has a chevron profiling 15 to 19 thereon, by means of which the bulk material (not illustrated) should be held, that is, should be secured against sliding, even in the case of relatively large gradients of, for example, above 35° or at least above an angle of repose of the bulk material. The chevron profiling 15 to 19 has diagonal elements 15, as are also used for oblique-protuberance belts, for which reason these diagonal elements 15 may also be referred to as oblique protuberances 15. The diagonal elements 15 are preferably formed in one piece with the carrying-side cover panel 12, that is, are also formed during the vulcanization of the carrying-side cover panel 12. They are arranged, in the region between the peripheral zones (A, B), over a width G in the transverse direction Y of the conveyor belt 1 to provide a V-shape, of which the point 16 is oriented in the longitudinal direction X counter to the conveying direction Q. The point 16 is supported, or reinforced, counter to the conveying direction Q by a longitudinal extension 17.

Figure 4:
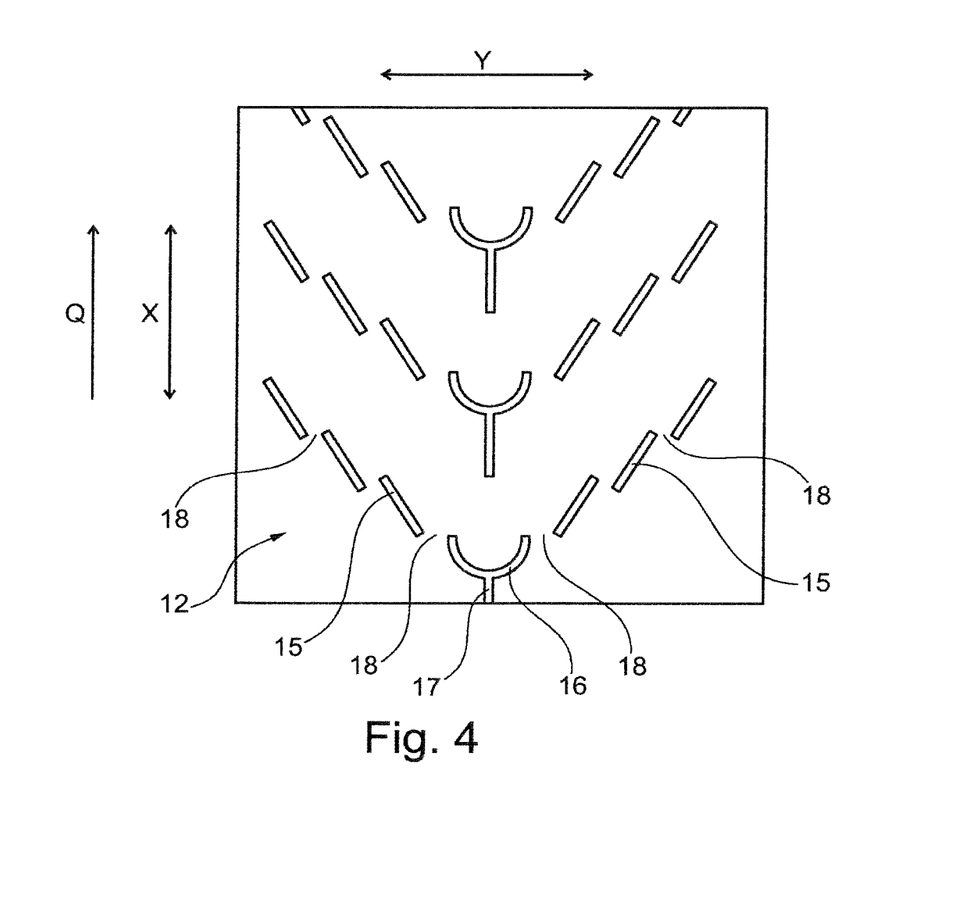
FIG. 4 shows a schematic plan view of a preferred embodiment of a single-formation profiling of a conveyor belt according to the invention.
Figure 5:
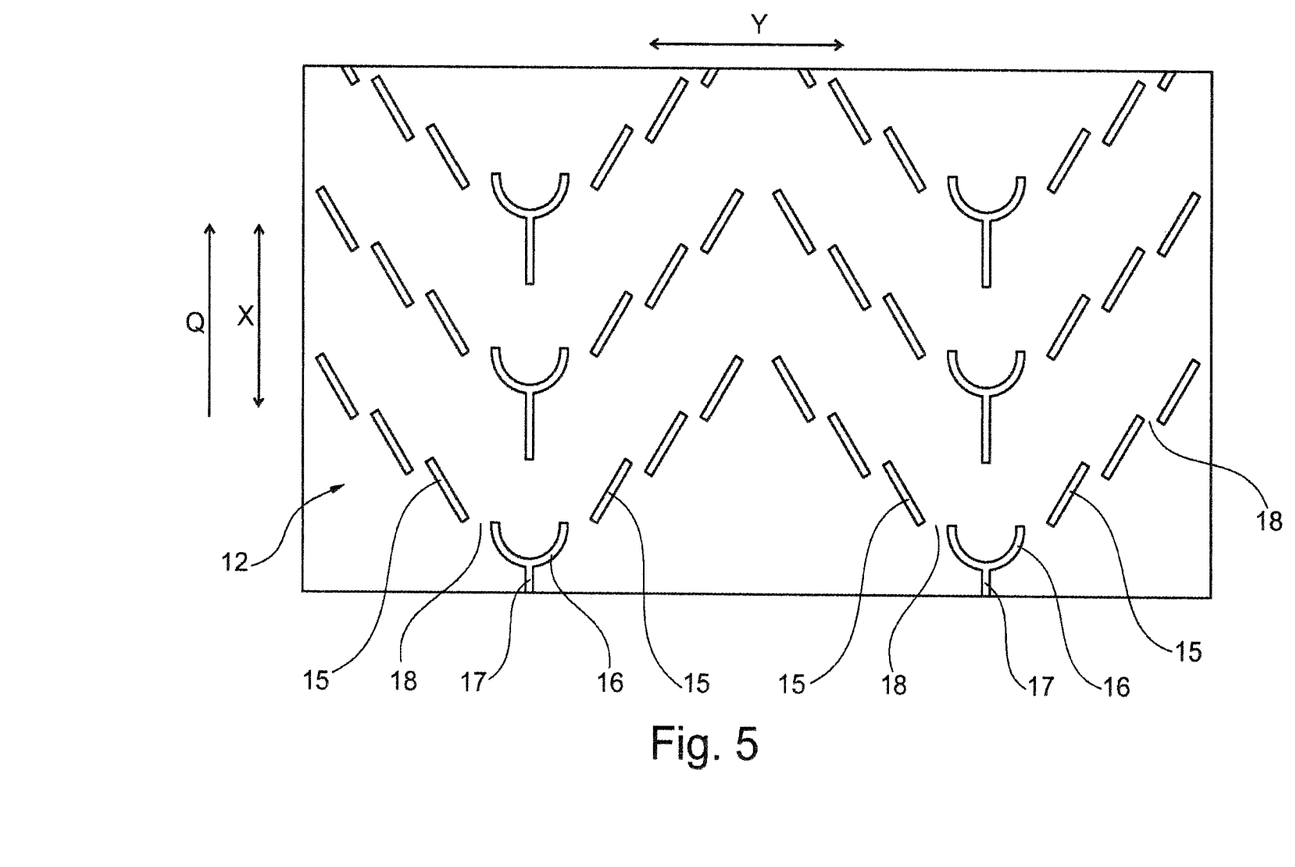
FIG. 5 shows a schematic plan view of a preferred embodiment of a double-formation profiling of a conveyor belt according to the invention.
Figure 6A:
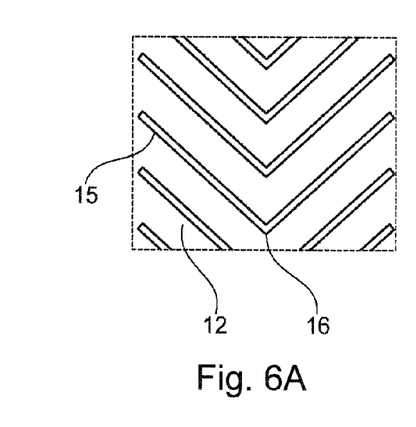
Figure 6B:
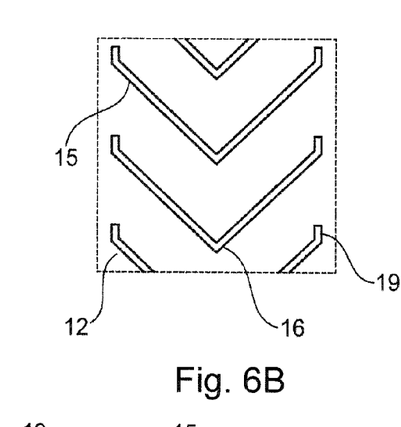
Figure 6C:
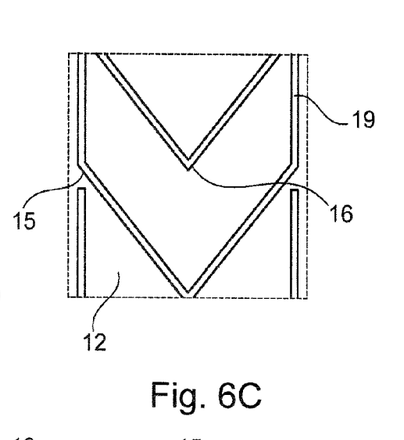
Figure 6D:
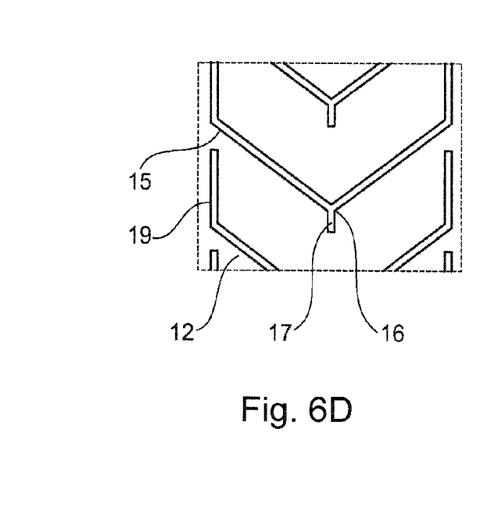
Figure 6E:
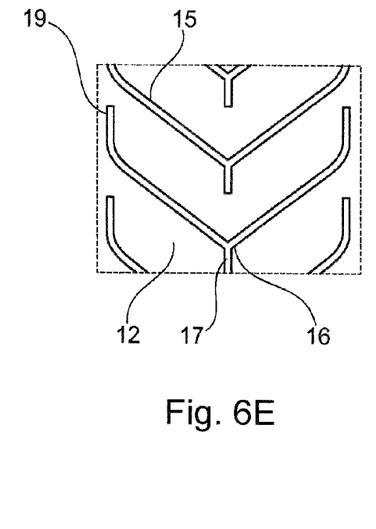
Figure 6F:
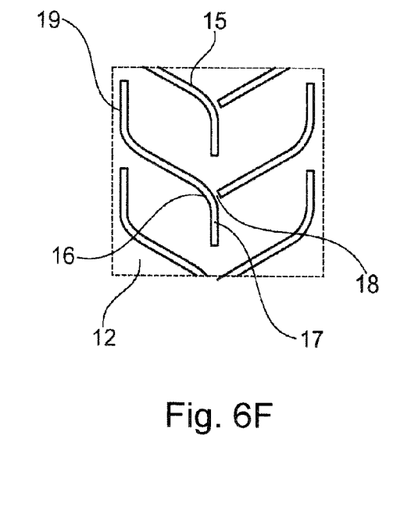
Figure 7A:
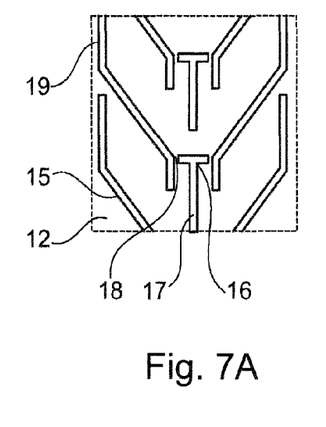
Figure 7B:
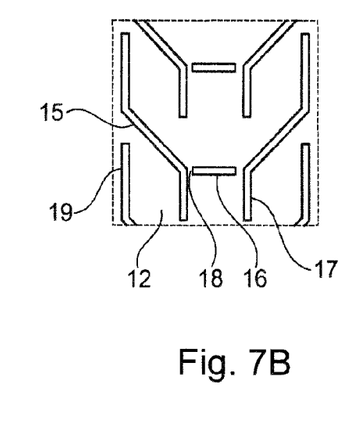
Figure 7C:
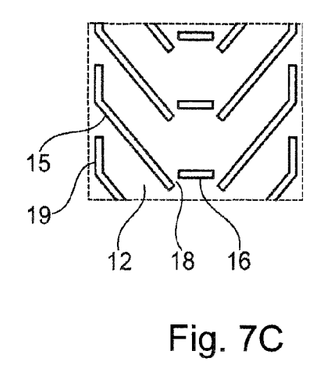
Figure 7D:
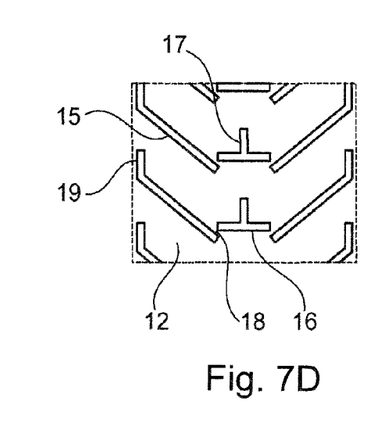
Figure 7E:
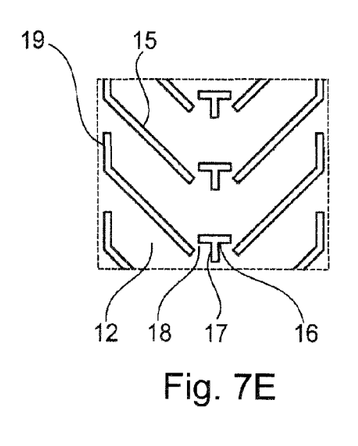
Figure 7F:
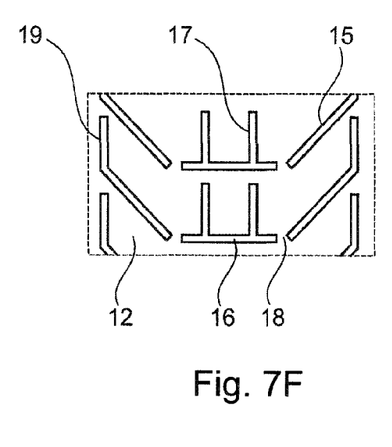
Figure 8A:
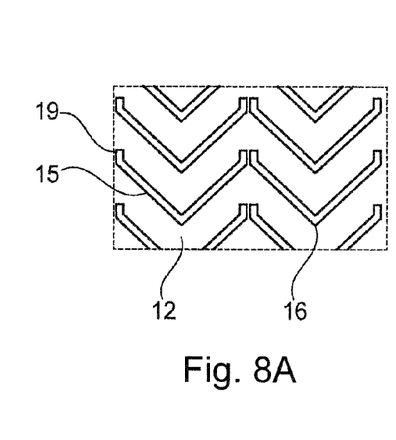
FIGS. 8A to 8F show schematic plan views of various embodiments of a double-formation profiling of a conveyor belt according to the invention; and, FIG. 9 shows a schematic illustration of a section through a pocket conveyor belt according to the invention.
Figure 8B:
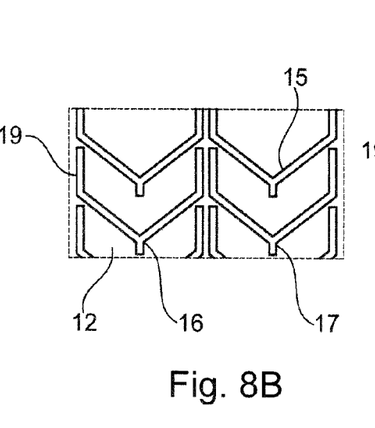
Figure 8C:
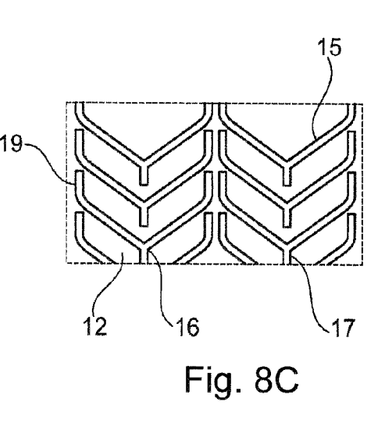
Figure 8D:
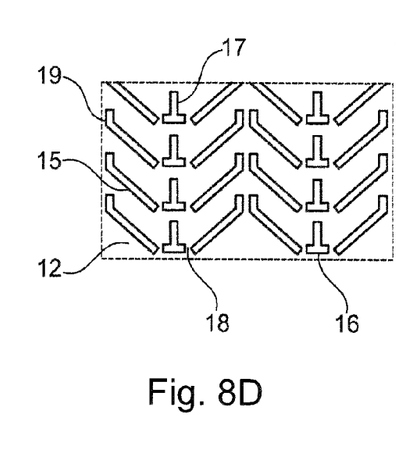
Figure 8E:
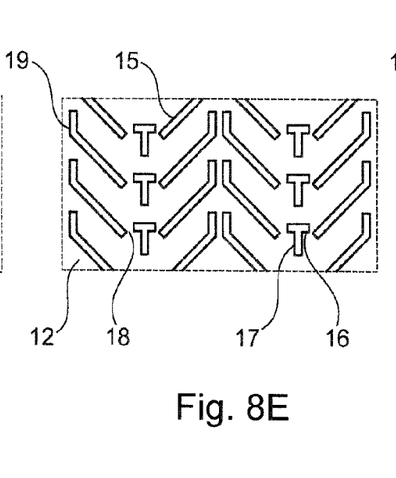
Figure 8F:
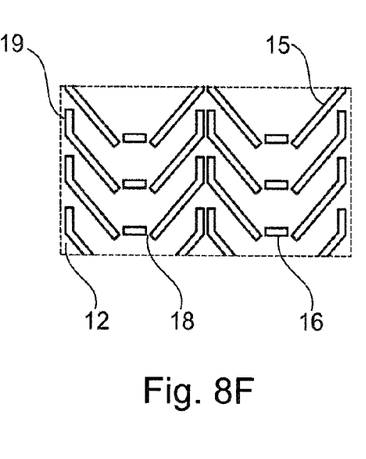

In the preferred embodiment of FIG. 4, the point 16 is of semicircular configuration in the conveying direction Q in order to receive some of the bulk material, and retain it, in the trough formed by the semicircle. The diagonal elements 15 are spaced apart by interruptions 18, and therefore all of the individual diagonal elements 15 taken as a whole, once again, provide a V-shape. The individual diagonal elements 15, however, are oriented at a steeper gradient than all of the diagonal elements taken as a whole. FIG. 5 shows a double-formation profiling of the preferred embodiment.

The diagonal elements 15, both individually and taken as a whole, extend both in the conveying direction X and in the transverse direction Y. As a result of this arrangement, and possibly of their interruptions 18, the diagonal elements 15 retain the conveyed bulk material essentially in a force-fitting manner on the carrying-side cover panel 12. This means that, even in the case of the diagonal elements 15 being of low height D, the conveyed bulk material is subjected to comparatively large retaining forces. These forces may be influenced by the configuration of the diagonal elements 15 in the direction of orientation of each individual element, of the orientation of all of the oblique protuberances 15 taken as a whole, and of the shape and height D of the diagonal elements, et cetera.

FIGS. 6A to 7F show schematic plan views of various embodiments of single-formation profiling 15 to 19 of a conveyor belt 1 according to the invention. FIGS. 8A to 8F show the corresponding views of double-formation profilings 15 to 19. These all have, in addition to the illustrations of FIGS. 4 and 5, a longitudinal extension 19 on the diagonal elements 15 in the form of a lateral retaining element for the conveyed material.

Figure 9:
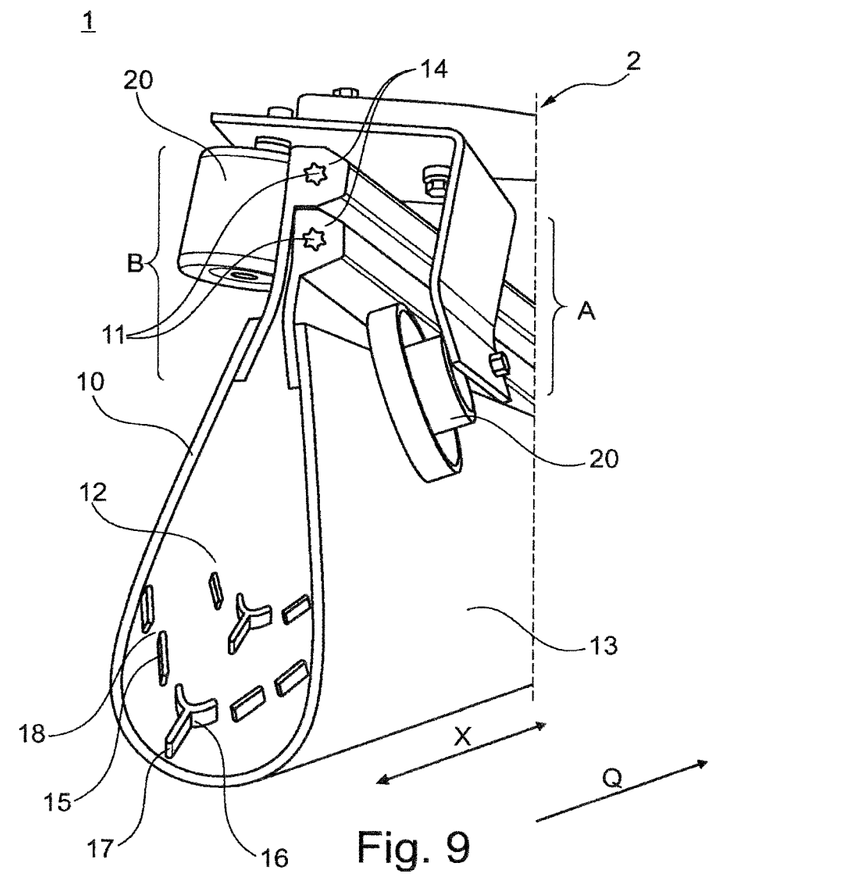

FIG. 9 shows a schematic of a section through a pocket conveyor belt 1 according to the invention. The two peripheral zones (A, B) here are provided on the outer lateral edges 14 of the spread-out pocket conveyor belt 1 and each have a tension member 11. The two peripheral zones (A, B) are positioned one upon the other such that, during operation, the one edge 14 is arranged vertically beneath or above the other edge 14; in this state, the edge regions 14 are retained between the carrying rollers 20. The carrying-side cover panel 12 is understood to mean the inner side of the belt body 10, the inner side having the chevron profiling 15 to 19 and receiving the conveyed material (not illustrated), and the running-side cover panel 13 is understood to mean the outer side of the belt body 10, the carrying rollers 20 butting against the outer side.

It is understood that the foregoing description is that of the preferred embodiments of the invention and that various changes and modifications may be made thereto without departing from the spirit and scope of the invention as defined in the appended claims.

LIST OF DESIGNATIONS (Part of the Description)
A First peripheral zone
B Second peripheral zone
C Belt thickness, belt height
D Height of the profiling 15
E Belt width
G Width of the profiling 15
R Radius, radial direction
Q Conveying direction of the conveyor belt 1
Y Transverse direction
X Longitudinal direction, conveying direction
Z Direction perpendicular to X and Y 1 Conveyor belt, tubular conveyor belt, tube belt, pocket conveyor belt
10 Belt body
11 Reinforcement member, tension member, strength member
12 Carrying-side cover panel, carrying side
13 Running-side cover panel, running side
14 Overlapping region, longitudinal peripheries, belt flanks
15 Diagonal elements, oblique protuberances on the carrying side 12
16 Point of the profiling
17 Longitudinal extension of the point 16
18 Interruption of the diagonal elements 15 and/or point 16
19 Longitudinal extension of the diagonal elements 15
2 Carrying-roller station
20 Carrying rollers
30 Steel-cable transverse reinforcement
31 Textile transverse reinforcement

What is claimed is:

1. A conveyor belt movable in a conveying direction (Q) and defining a longitudinal direction (X) and a transverse direction (Y), the conveyor belt comprising:
    a carrying-side cover plate of elastomer material and a running-side cover plate of elastomer material;
    said cover plates conjointly defining a belt body having a plurality of reinforcement elements embedded therein;
    said belt body having respective edge zones and being closable so as to cause said edge zones to overlap and be in mutual contact engagement to form one of a tube conveyor belt and a pocket conveyor belt;
    said carrying-side cover plate having a profile arrangement formed thereon essentially perpendicular thereto;
    said carrying-side cover together with said profile arrangement conjointly being configured for a force-fitting material transportation;
    said profile arrangement being a chevron profile arrangement including a plurality of diagonal elements which extend in both said longitudinal direction (X) and said transverse direction (Y) of said conveyor belt; and,
    each two of said diagonal elements conjointly defining a pair with multiple pairs defining a V-formation having a tip aligned in a direction opposite to said conveying direction (Q).

2. The conveyor belt of claim 1, wherein said chevron profile arrangement has a width (G) which corresponds essentially to the belt width between said edge zones.

3. The conveyor belt of claim 1, wherein said chevron profile arrangement has a width (G) which corresponds essentially to the width (E) of said belt body up to the horizontal of the pocket conveyor belt in the closed state.

4. The conveyor belt of claim 1, wherein said chevron profile arrangement is provided in duplicate in said transverse direction (Y).

5. The conveyor belt of claim 1, wherein said chevron profile arrangement is provided in triplicate in said transverse direction (Y).

6. The conveyor belt of claim 1, wherein said belt body has a belt thickness (C); said chevron profile arrangement has an elevation (D) in a direction (Z) perpendicular to said carrying-side cover plate; and, said elevation (D) is a maximum of twice said belt thickness (C).

7. The conveyor belt of claim 1, wherein said belt body has a belt thickness (C); said chevron profile arrangement has an elevation (D) in a direction (Z) perpendicular to said carrying-side cover plate; and, said elevation (D) is a maximum of 1.5 times said belt thickness (C).

8. The conveyor belt of claim 1, wherein said belt body has a belt thickness (C); said chevron profile arrangement has an elevation (D) in a direction (Z) perpendicular to said carrying-side cover plate; and, said elevation (D) corresponds maximally to said belt thickness (C).

9. The conveyor belt of claim 1, wherein said belt body has a width (E); said chevron profile arrangement has an elevation (D) in a direction (Z) perpendicular to said carrying-side cover plate; and, said elevation (D) corresponds maximally to one-tenth of said belt width (E).

10. The conveyor belt of claim 1, wherein said belt body has a width (E); said chevron profile arrangement has an elevation (D) in a direction (Z) perpendicular to said carrying-side cover plate; and, said elevation (D) corresponds maximally to one-fiftieth of said belt width (E).

11. The conveyor belt of claim 1, wherein said belt body has a width (E); said chevron profile arrangement has an elevation (D) in a direction (Z) perpendicular to said carrying-side cover plate; and, said elevation (D) corresponds maximally to one-hundredth of said belt width (E).

12. The conveyor belt of claim 1, wherein:
    said diagonal elements are individual diagonal elements arranged so as to cause each two mutually adjacent ones thereof to conjointly define an interruption therebetween;
    said individual diagonal elements each extend in said longitudinal direction (X) as well as said transverse direction (Y) so as to conjointly provide a V-formation; and,
    said individual diagonal elements have an alignment different than the totality of the diagonal elements arranged one next to the other.

13. The conveyor belt of claim 12, wherein said alignment of said individual diagonal elements is more toward said longitudinal direction (X).

14. The conveyor belt of claim 12, wherein said tip of said V-formation has an extension in length in said longitudinal direction (X) opposite to said conveying direction (Q).

15. The conveyor belt of claim 1, wherein at least one of said diagonal elements has an end facing away from said tip; and, said at least one diagonal element has a length extension at said end in said length direction (X).

16. The conveyor belt of claim 1, wherein said tip is configured as an element running in said transverse direction (Y) and spaced by a cutout from said diagonal elements.

17. The conveyor belt of claim 1, further comprising at least one transverse reinforcement.

18. The conveyor belt of claim 1, wherein said chevron profile arrangement is an integral part of said carrying-side cover plate.

19. The conveyor belt of claim 1, wherein the force-fitting material transportation counteracts a sliding of conveyable material in a case of inclination.

* * * * *